US 12,451,105 B2

(12) United States Patent
Nagatsuma

(10) Patent No.: US 12,451,105 B2
(45) Date of Patent: Oct. 21, 2025

(54) INSTRUMENT STAND AND KEYBOARD INSTRUMENT SET

(71) Applicant: CASIO COMPUTER CO., LTD., Tokyo (JP)

(72) Inventor: Shigeyuki Nagatsuma, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 271 days.

(21) Appl. No.: 18/133,726

(22) Filed: Apr. 12, 2023

(65) Prior Publication Data

US 2023/0335087 A1    Oct. 19, 2023

(30) Foreign Application Priority Data

Apr. 14, 2022  (JP) .................................. 2022-066723

(51) Int. Cl.
  *G10G 5/00*  (2006.01)
  *G10C 3/26*  (2019.01)

(52) U.S. Cl.
  CPC .............. *G10G 5/005* (2013.01); *G10C 3/26* (2013.01)

(58) Field of Classification Search
  CPC ................................... G10G 5/005; G10C 3/26
  See application file for complete search history.

(56) References Cited

U.S. PATENT DOCUMENTS

| 4,445,415 | A  | * | 5/1984  | Izquierdo | G10G 7/005 984/259 |
| 4,634,090 | A  | * | 1/1987  | Currie    | G10H 1/32 984/344 |
| 6,720,490 | B1 | * | 4/2004  | Bruce     | A47B 19/002 84/421 |
| 8,723,010 | B1 | * | 5/2014  | Knights   | G10G 5/00 84/424 |
| 10,224,011 | B2 | * | 3/2019 | Hoshino   | G10H 1/32 |
| 2005/0121564 | A1 | * | 6/2005 | Johnson | F16M 11/18 248/125.1 |
| 2008/0257131 | A1 | * | 10/2008 | Nakata | G10C 3/26 84/426 |
| 2018/0350335 | A1 | * | 12/2018 | Hoshino | G10G 5/005 |
| 2023/0335082 | A1 | * | 10/2023 | Nagatsuma | G10C 3/04 |
| 2023/0335087 | A1 | * | 10/2023 | Nagatsuma | G10G 5/005 |
| 2023/0335088 | A1 | * | 10/2023 | Nagatsuma | G10G 5/00 |
| 2024/0347027 | A1 | * | 10/2024 | McGee | G10G 5/005 |

FOREIGN PATENT DOCUMENTS

| CA | 3152076 | A1 | * | 10/2021 | ........... F16M 11/046 |
| CN | 102402972 | A | * | 4/2012 | .............. G10C 3/26 |
| CN | 221466162 | U | * | 8/2024 | |
| JP | 08-292768 | A |   | 11/1996 | |
| JP | 11-202858 | A |   | 7/1999  | |
| JP | 2008-003492 | A | | 1/2008  | |
| JP | 3182648 | U |   | 4/2013  | |

* cited by examiner

*Primary Examiner* — Robert W Horn
(74) *Attorney, Agent, or Firm* — Fitch, Even, Tabin & Flannery LLP

(57) ABSTRACT

An instrument stand includes a connector configured to fix a horizontal spanning member and including an instrument attachment portion, a pedal frame fixing portion, and a leg attachment portion.

8 Claims, 7 Drawing Sheets

INSTRUMENT STAND AND KEYBOARD INSTRUMENT SET

CROSS-REFERENCE TO RELATED APPLICATION

This patent application is based upon and claims the benefit of priority under 35 USC 119 of Japanese Patent Application No. 2022-066723 filed on Apr. 14, 2022, the entire disclosure of which, including the specification, claims, drawings and abstract, is incorporated herein by reference in its entirety.

BACKGROUND

Technical Field

The present disclosure relates to an instrument stand and a keyboard instrument set.

Description of the Related Art

Conventionally, a musical instrument is often accompanied by a pedal device in order to provide for a damper effect. For example, a keyboard instrument including a two-stage keyboard, a pedal device including foot pedals, and an instrument stand for supporting a keyboard instrument are disclosed. Japanese Unexamined Patent Application Publication No. 2008-3493 (JP-A-2008-3493) discloses an example of such a instrument stand.

SUMMARY

According to an aspect of the present disclosure, there is provided an instrument stand including a connector configured to fix a horizontal spanning member and including an instrument attachment portion, a pedal frame fixing portion, and a leg attachment portion.

According to another aspect of the present disclosure, there is provided a keyboard instrument set including the instrument stand and a keyboard instrument.

DESCRIPTION OF THE EMBODIMENT

Figure 1:
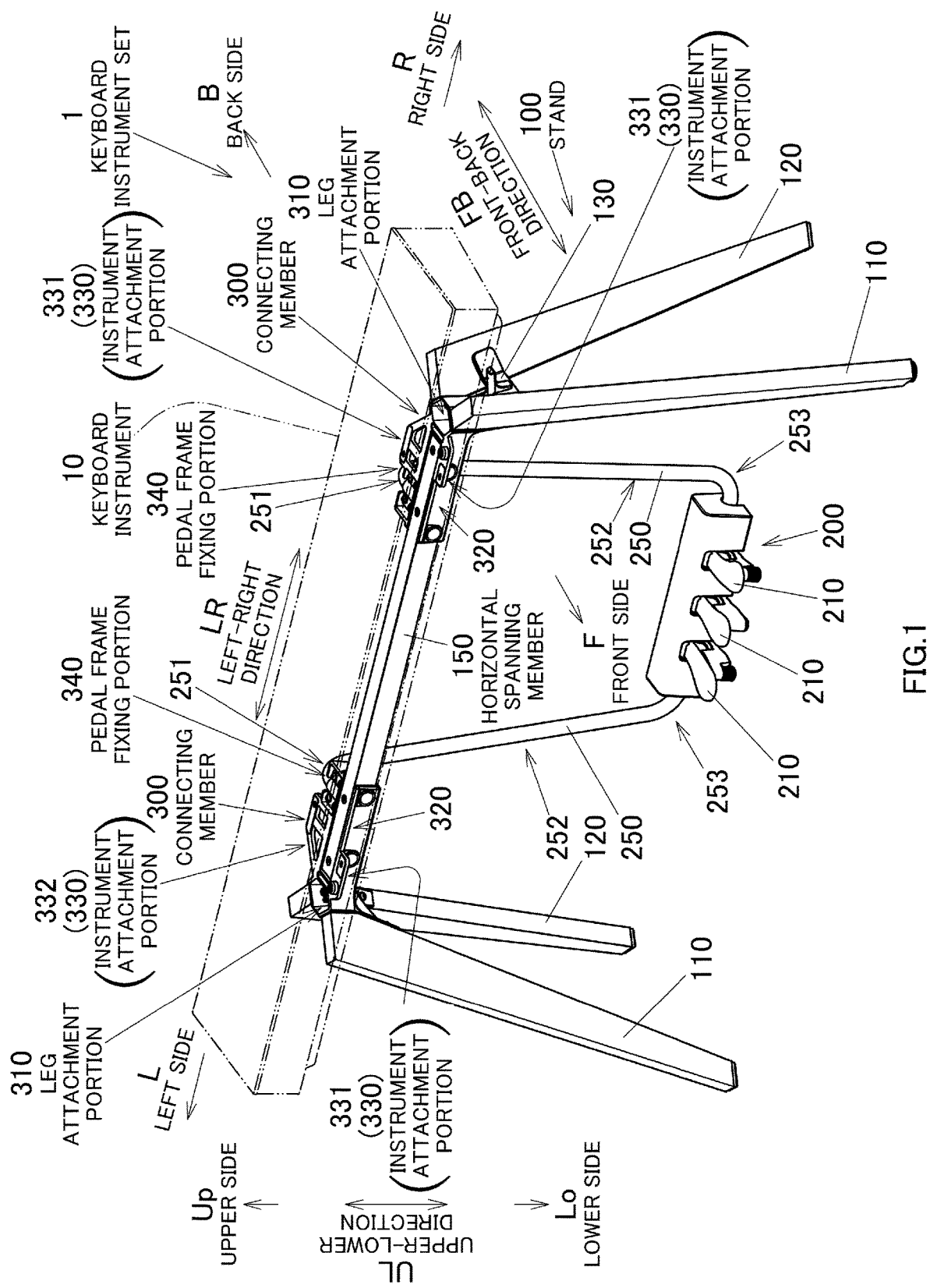
FIG. 1 is a perspective view showing an instrument stand according to an embodiment of the present disclosure.

Hereinafter, an embodiment of the present disclosure will be described based on drawings. FIG. 1 shows an instrument stand 100 (an instrument stand) for supporting a keyboard instrument 10 of a rectangular parallelepiped shape, which is shown by chain double-dashed lines therein. A keyboard instrument set 1 includes the keyboard instrument 10 and the stand 100. The stand 100 includes a pedal device 200 which includes three pedals 210. In the following description, a front-back direction of the pedals 210 (a front-back direction of keys, not shown, of the keyboard instrument 10) is referred to as a front-back direction FB. The front to the pedals 210 is referred to as a front side F (a player's side), while the back to the pedals 210 is referred to as a back side B. A direction in which the pedals 210 are aligned (an alignment direction of the keys, not shown, of the keyboard instrument 10) is referred to as a left-right direction LR. Then, in this state, when facing the pedal device 200 from the front side F, the left to the pedal device 200 is referred to as a left side L, while the right to the pedal device 200 is referred to as a right side R. In addition, when viewing the pedal device 200 in an upper-lower direction UL thereof, an upper side is referred to as an upper side Up, while a lower side is referred to as a lower side Lo. In the present embodiment, while the keyboard instrument 10 is described as a supporting target of the stand 100, the supporting target may be other musical instruments.

Figure 2:
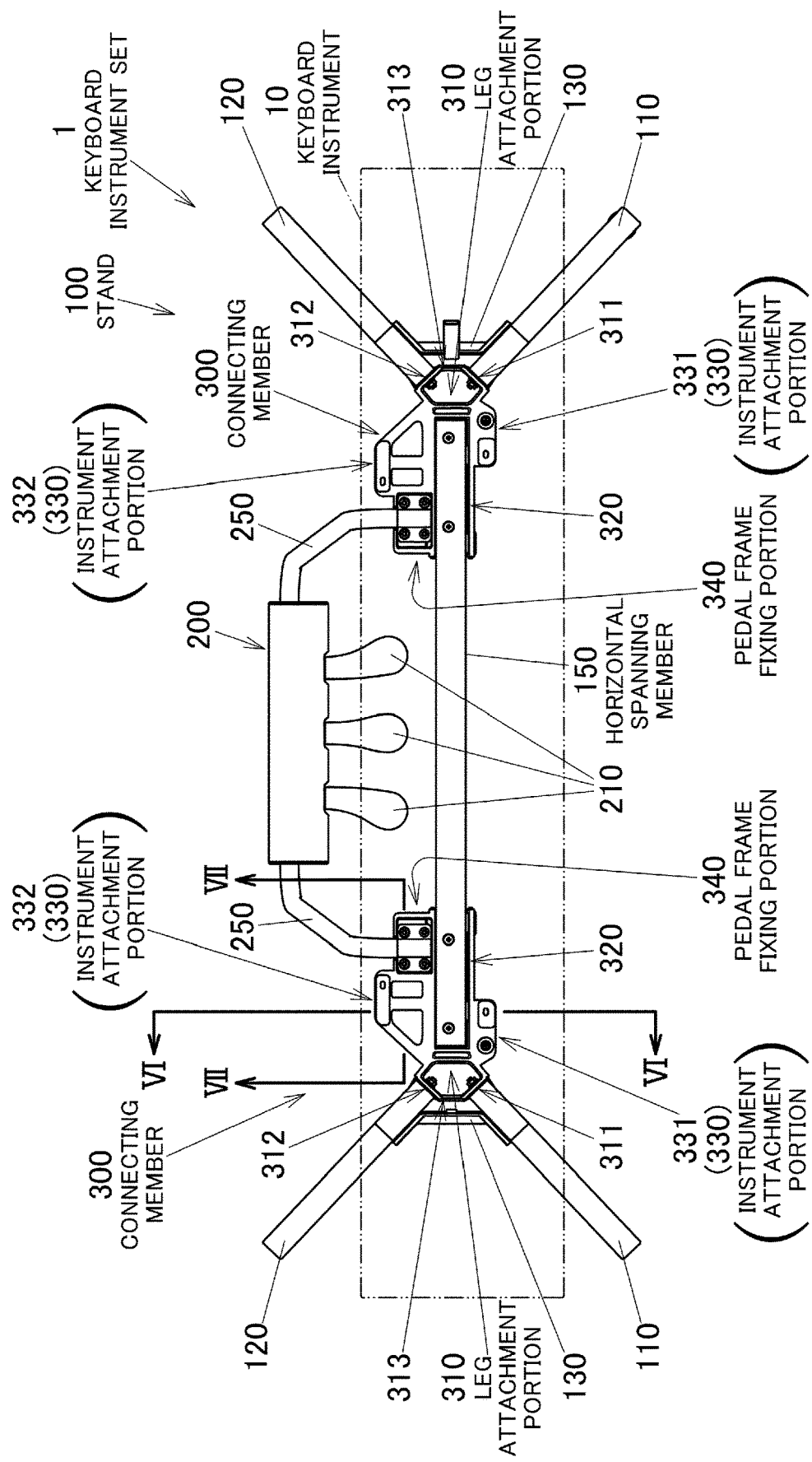
FIG. 2 is a plan view of the instrument stand according to the embodiment of the present disclosure.

As shown in FIGS. 1 and 2, the stand 100 includes an angular tube-shaped spanning member 150, which is elongated in the left-right direction LR, two connectors 300 which are provided at both end portions of the horizontal spanning member 150 one for each end portion, and first leg members 110 and second leg members 120, of which one first leg member 110 and one second leg member 120 are provided on each of the two connectors 300. The pedal device 200 is attached to the connectors 300 via solid round bar-like pedal frames 250. The connectors 300 each include a horizontal spanning member fixing portion 320, an instrument attachment portion 330, a pedal frame fixing portion 340, and a let attachment portion 310.

The stand 100 is configured substantially symmetrical laterally when viewed from the front-back direction FB. Thus, in the following description, the embodiment will be described by drawing attention to the connector 300 on the left side L.

Figure 3:
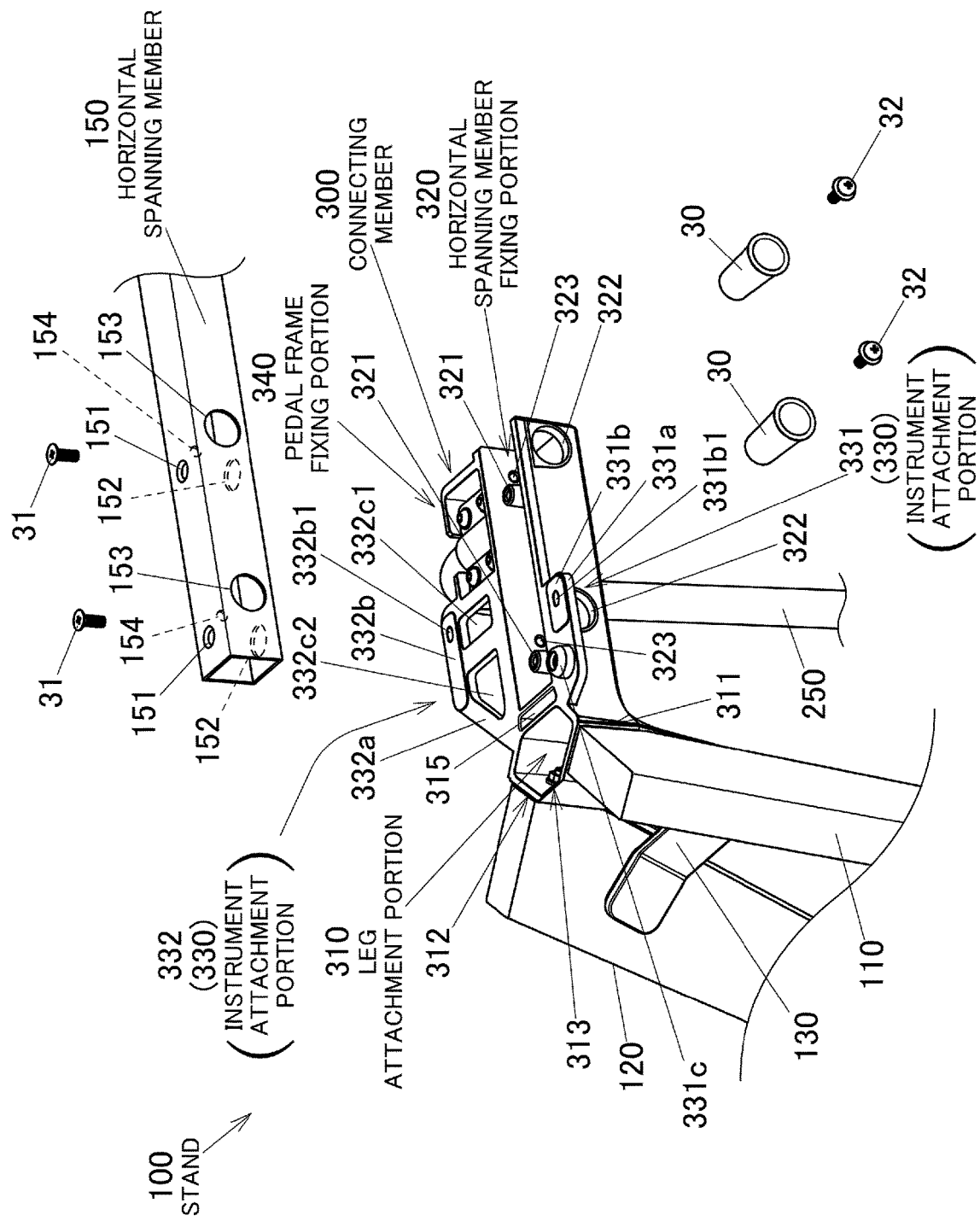
FIG. 3 is an exploded perspective view of a horizontal spanning member fixing portion associated with a left connector of the instrument stand according to the embodiment of the present disclosure.
Figure 4:
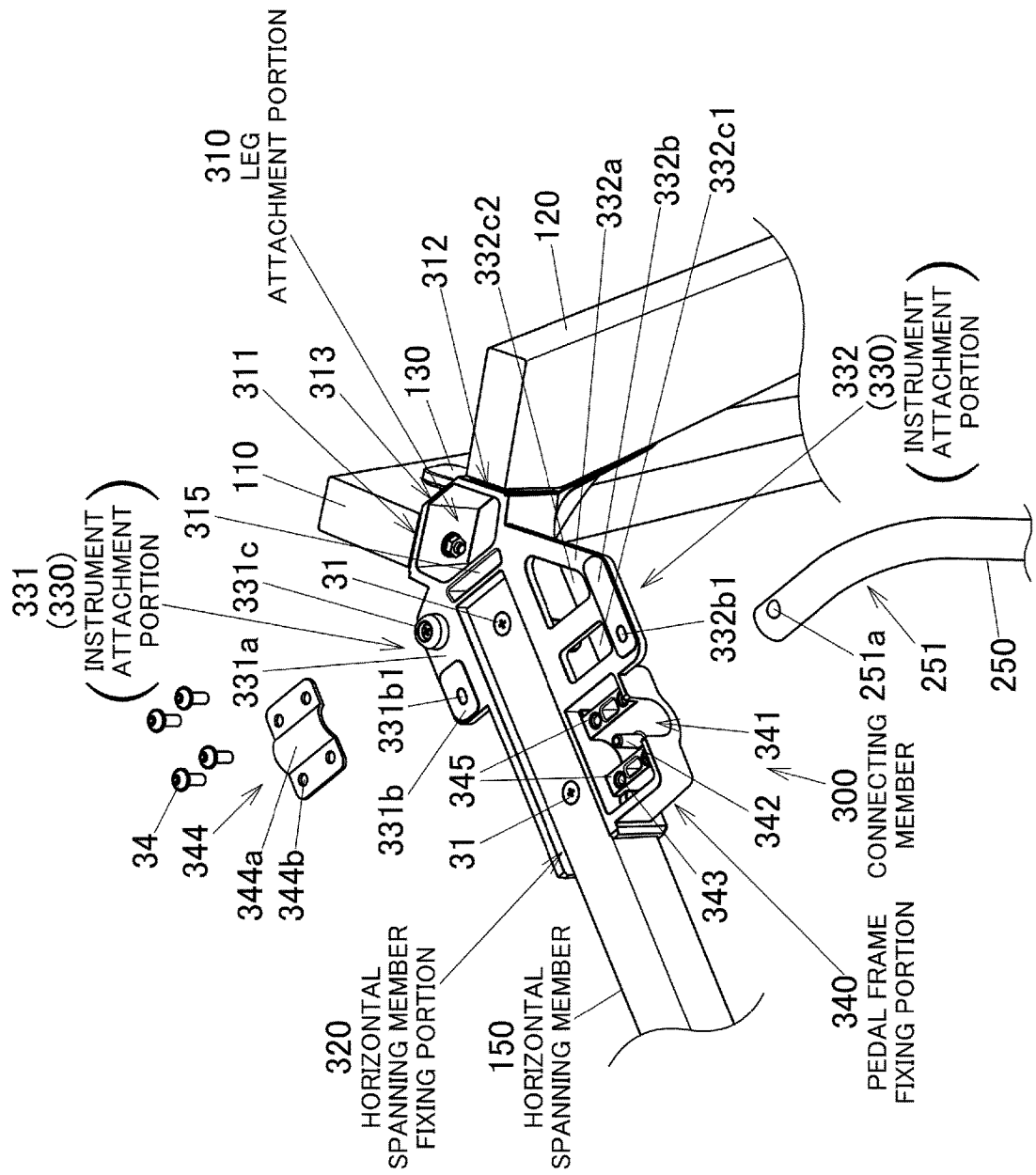
FIG. 4 is an exploded perspective view of a pedal frame fixing portion associated with the left connector of the instrument stand according to the embodiment of the present disclosure.
Figure 5:
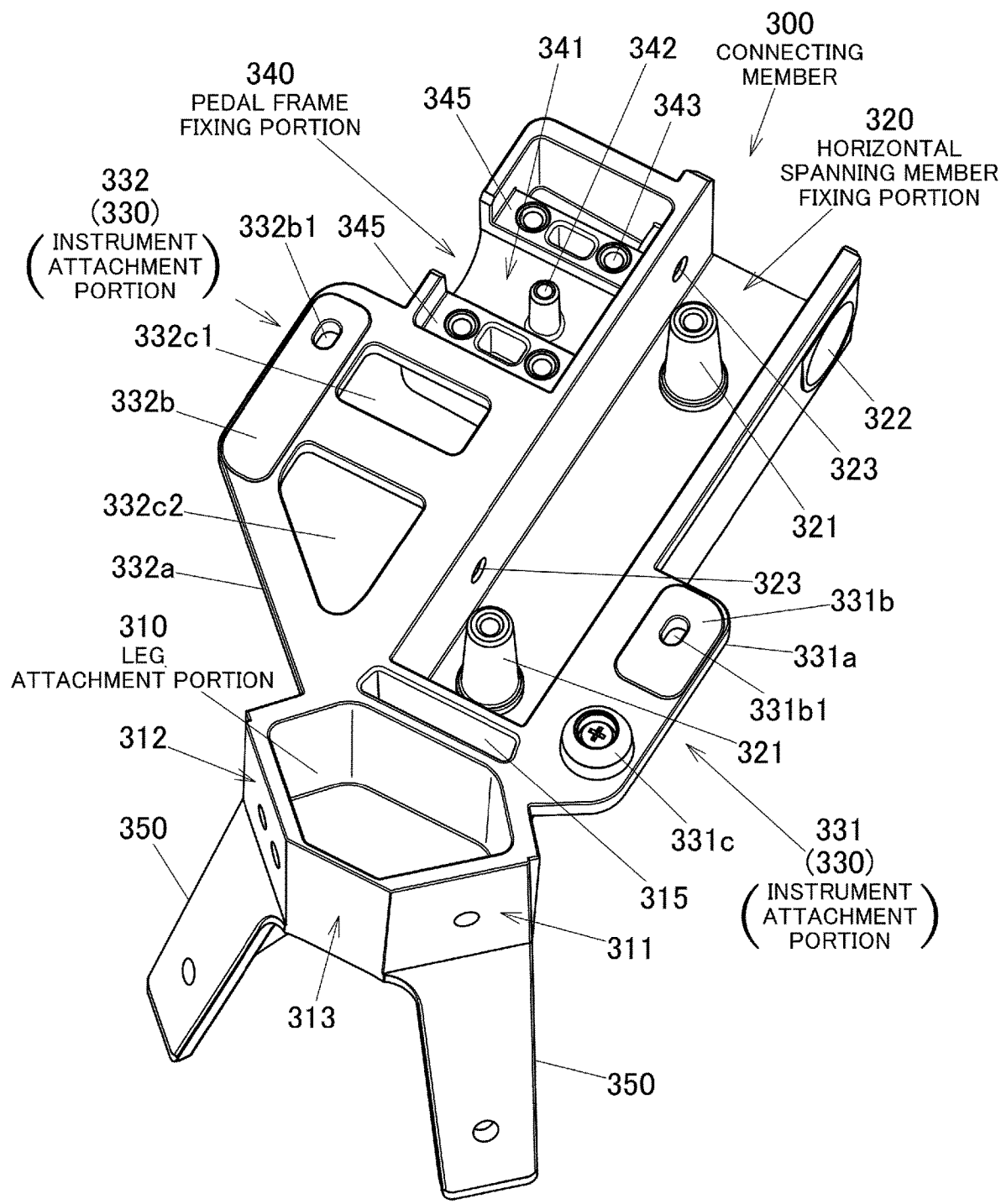
FIG. 5 is a perspective view of the connector of the instrument stand according to the embodiment of the present disclosure.

As shown in FIGS. 3 to 5, the connector 300 includes a bottomed leg attachment portion 310 of a substantially hexagonal tubular shape provided on an outer side (a left side L in the case of the connector 300 on the left side L) thereof in the left-right direction LR. In other words, the leg attachment portion 310 is disposed further outwards in the left-right direction LR than the pedal frame fixing portion 340 and the instrument attachment portion 330. The let attachment portion 310 has a first leg fixing surface 311, which is parallel to the upper-lower direction UL and of which a normal is inclined to the front side F substantially at 45 degrees from the left-right direction LR, a second leg fixing surface 312, which intersects the first leg fixing surface 311 substantially at 90 degrees, and a connecting surface 313, which is substantially parallel to the front-back direction FB so as to connect the first leg fixing surface 311 and the second leg fixing surface 312 together. A first leg member 110, which has a substantially rectangular horizontal cross section, is fixed to the first leg fixing surface 311.

The first leg member 110 is attached to the first leg fixing surface 311 in such a manner that a fixing surface of the first leg member 110, which is parallel to the upper-lower direction UL, is brought into surface abutment with the first leg fixing surface 311 so as to be fastened thereto with a screw. Similarly, the second leg member 120, which has substantially the same shape as that of the first leg member 110, is fixed to the second leg fixing surface 312.

An angle brace member 130 is provided between the first leg member 110 and the second leg member 120 for reinforcement.

Figure 6:
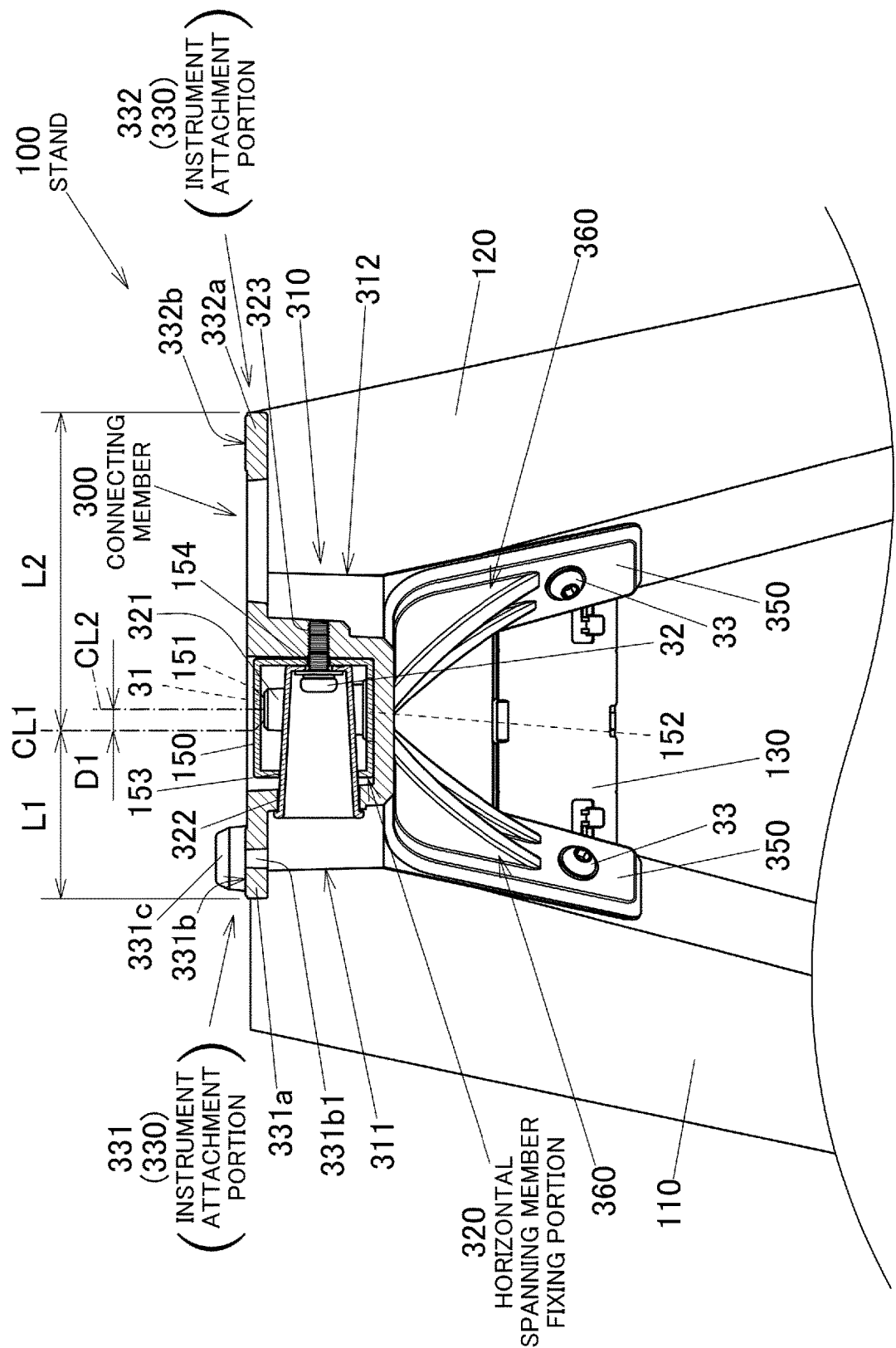
FIG. 6 is a sectional view of the instrument stand according to the embodiment of the present disclosure taken along a line VI-VI in FIG. 2.

A horizontal spanning member fixing portion 320, which is formed into a recessed groove shape, is provided on an inner side (a right side R in the case of the connector 300 on the left side L) of the leg attachment portion 310 of the connector in the left-right direction LR via a thickness-removing recessed portion 315. As shown in FIG. 3, two boss-shaped fixing portions 321 are provided on the horizontal spanning member fixing portion 320 in such a manner as to rise upright from a base of the recessed groove to taper to the upper side Up. As shown in FIG. 6, the boss-shaped fixing portion 321 is disposed on the horizontal spanning member fixing portion 320 in such a manner that an axis center CL2, which is a center, of the boss-shaped fixing portion 321 is offset further backwards towards the back side B by a distance Dl than a center CL1 of the stand 100 in the front-back direction FB. In the present embodiment, as illustrated in FIG. 2, of the two connectors 300, a first connector 300 is fixed to one end (a right end) of the horizontal spanning member 150, and a second connector 300 is fixed to the other end (a left end) of the horizontal spanning member 150. Since these boss-shaped fixing portions 321 are provided on the connector 300, the second connector 300 never fits on the one end (the right end) of the horizontal spanning member 150. Similarly, the first connector 300 never fits on the other end (the left end) of the horizontal spanning member 150. This is because, in assembling the horizontal spanning member 150 and the connector 300 together, spacers 30 need to be assembled in such a state that spacer insertion hole portions 153 in the horizontal spanning member 150 are aligned with circular hole portions 322 in the connector 300. An internally threaded portion is provided at a distal end portion of each of the boss-shaped fixing portions 321.

As shown in FIG. 3, the circular hole portions 322, which are two, are provided in a wall portion on the front side F of the recessed groove of the horizontal spanning member fixing portion 320. Internally threaded portions 323 are provided in a wall portion on the back side B of the recessed groove in the horizontal spanning member fixing portion 320 coaxially with the corresponding circular hole portions 322.

The horizontal spanning member 150 is provided into an angular tubular shape. Two screw hole portions 151 are provided in an upper surface of each of both the end portions of the horizontal spanning member 150 in such a manner as to be aligned in the left-right direction LR. In a lower surface of each of both the end portions of the horizontal spanning member 150, boss insertion holes 152 are provided coaxially with the corresponding screw hole portions 151. The two spacer insertion hole portions 153 are provided in a front surface of each of both the end portions of the horizontal spanning member 150 in such a manner as to be aligned in the left-right direction LR. Screw hole portions 154 are provided in a rear surface of each of both the end portions of the horizontal spanning member 150 coaxially with the corresponding spacer insertion hole portions 153.

As shown in FIG. 6, the boss-shaped fixing portions 321 of the horizontal spanning member fixing portion 320 are inserted in the corresponding boss insertion holes 152 in the horizontal spanning member 150. Then, screw members 31 are screwed into the internally threaded portions of the boss-shaped fixing portions 321 via the screw hole portions 151.

In addition, as shown in FIG. 3, the spacers 30, which are each formed from a resin into a bottomed cylinder which tapers towards a smaller-diameter bottom side thereof (a farther side as viewed from the front with the spacer 30 assembled into the connector 300), are inserted in the spacer insertion hole portions 153 from the smaller-diameter bottom sides. Then, screw members 32, which are screws like double sems screws (screws in which a flat washer including a spring washer is incorporated) for preventing an occurrence of mechanical looseness, are screwed into the corresponding internally threaded portions 323 via bottom portions of the spacers 30. In this way, the horizontal spanning member 150 is fixed to the connector 300.

The screwing operation of screwing the screw members 32 into the internally threaded portions 323 is facilitated by guiding the screw members 32 with the spacers 30. In addition, the spacers 30 reduce a risk of occurrence of an injury to the finger or fingers of the hand of the user which would be caused by burrs produced inside the circular hole portions 322 and the spacer insertion hole portions 153 when the screw members 323 are screwed to fasten the connector 300 and the keyboard instrument 10 together. The spacer 30 also reduces a risk of the finger or the like being caught at the circular hole portion 322 when a screw member is attached via a screw hole portion 331b in a front abutment surface 331b, which will be described later.

As shown in FIGS. 3 and 4, an instrument attachment portion 330, which includes a front instrument attachment portion 331 and a back instrument attachment portion 332, is provided on a front side F and a back side B of the horizontal spanning member fixing portion 320 (the horizontal spanning member 150). The front instrument attachment portion 331 on the front side F includes a front base portion 331a. The front base portion 331a is formed into a substantially rectangular plate shape, which is elongated in the left-right direction LR, with a flat surface portion oriented upwards in the upper-lower direction UL and is provided to project from an upper end of the wall portion on the front side F of the recessed groove of the horizontal spanning member fixing portion 320 towards the front side F. A part of this front base portion 331a is disposed contiguously with a part of a polygonal portion as the leg attachment portion 310 which is provided at one edge side of the connector 300. As a result, the stand 100 becomes stable by supporting the keyboard instrument 10 at both the left and right end sides thereof, thereby making it possible to support the keyboard instrument 10 well. Then, even though the keyboard instrument 10 is supported in such a state that the keyboard instrument 10 is fixed to the connector 300, the deflection of the front base portion 331a is reduced as a result of the front base portion 331a being directly connecting to the leg attachment portion 310.

A front abutment surface 331b is provided at an inner side (a right side R in the case of the connector 300 on the left side L) portion on an upper surface of the front base portion 331a. This front abutment surface 331b is formed into a flat surface which projects upwards to a slight extent from the upper surface of the front base portion 331a. A screw hole portion 331b is provided in the front abutment surface 331b in such a manner as to penetrate it. A positioning pin 331c is provided on an outer side (a left side in the case of the connector 300 on the left side L) of the front abutment surface 331b. The front base portion 331a is substantially chamfered at a corner which faces the positioning pin 331c.

The back instrument attachment portion 332 on the back side B includes a back base portion 332a. The back base portion 332a is formed substantially into a right-angled trapezoidal plate shape of which an inclined surface is disposed outwards with a flat surface portion thereof oriented upwards in the upper-lower direction UL. The back base portion 332a is provided to project from an upper end of a wall portion on the back side B of the recessed groove of the horizontal spanning member fixing portion 320 towards the back side B. A back abutment surface 332b is provided at a back end portion of the back base portion 332a. This back abutment surface 332b is made into a substantially rectangular flat surface which projects upwards to a slight extent from an upper surface of the back base portion 332a and which is elongated in the left-right direction LR. A screw hole portion 332b1 is provided in the back abutment surface 332b in such a manner as to penetrate it as a through hole. A substantially rectangular hole portion 332c1 and a substantially triangular hole portion 332c2 are provided in the back base portion 332a. A part of this back base portion 332a is disposed contiguously with another part of the polygonal portion as the leg attachment portion 310 which is provided at the other edge side of the connector 300. As a result, as with the front base portion 331a, the deflection of the back base portion 332a is reduced which would be generated when the keyboard instrument 10 is attached to the stand 100.

As shown in FIG. 6, a distance L2 from the center CL1 of the stand 100 in the front-back direction FB to a back edge of the back base portion 332a is sufficiently larger than a distance L1 from the center CL1 to a front edge of the front base portion 331a (L2>L1). As a result, the back instrument attachment portion 332 (the back base portion 332a) is formed larger than the front instrument attachment portion 331 (the front base portion 331a).

In addition, the front abutment surface 331b and the back abutment surface 332b are brought into abutment with predetermined portions of a lower surface of the keyboard instrument 10 which faces the relevant abutment surfaces. As a result, a gap is defined between the upper surface of the connector 300 excluding the front abutment surface 331b and the back abutment surface 332b and upper surfaces of the first leg member 110 and the second leg member 120, and the lower surface of the keyboard instrument 10.

In the keyboard instrument 10, a back side B where a base plate, a speaker, and the like are disposed is heavier than a front side F where white keys and black keys are disposed. Thus, the keyboard instrument 10 has its center of gravity on the back side B in the front-back direction FB. In the stand 100, since the back side of the keyboard instrument 10 is supported by the back instrument attachment portion 332, which is larger in size than the front instrument attachment portion 331, the stand 100 can support the keyboard instrument 10 more stably.

As shown in FIGS. 5 and 6, extended portions 350 are provided on the connector 300, and these extended portions 350 include corresponding leg attachment surfaces which are extended downwards towards the lower side Lo from the first leg fixing surface 311 and the second leg fixing surface 312. The extended portions 35 and the first leg member 110 and the second leg member 120 are fixed together with screw members 33. In addition, the connector 300 includes reinforcement ribs 360 which are provided two for each extended portion 350 in such a manner as to extend from the lower surface of the leg attachment portion 310 downwards along back surfaces of the extended portions 350.

As shown in FIG. 4, the pedal frame fixing portion 340 is provided on an inner side (a right side R in the case of the connector 300 on the left side L) in the left-right direction LR of the back instrument attachment portion 332 of the instrument attachment portion 330 on the back side B of the horizontal spanning member 150. Here, as shown in FIG. 1, the pedal frames 250 are provided left and right and each include an upper end portion 251, a middle portion 252, and a lower end portion 253.

The upper end portion 251 is disposed such that its axis center is oriented in the front-back direction FB. The middle portion 252 connects to the upper end portion 251 via a bent portion and extends downwards while being inclined laterally inwards. The lower end portion 253 connects to a lower end of the middle portion 252 via a bent portion and connects to a left or right side face of the pedal device 200 with its axis center oriented in the left-right direction LR. The pedal frame 250 is made up of a solid steel material, and as shown in FIG. 4, an engagement hole 251a is provided in the upper end portion in such a manner as to penetrate the relevant portion in the upper-lower direction UL.

As shown in FIGS. 4 and 5, a groove portion 341 having an arc shape in section is provided in the pedal frame fixing portion 340 in such a manner as to extend along the front-back direction FB so that the upper end portion 251 of the pedal frame 250 can be place therein. A boss 342 is provided in the arc-shaped groove portion 341 in such a manner as to rise upright therefrom. In total, four internally threaded portions 343 are provided in two wall portions 345 of the arc-shaped groove portion 341 in the left-right direction LR.

In fixing the pedal frame 250 to the pedal frame fixing portion 340, the boss 323 is passed through the engagement hole 251a in the upper end portion 251 of the pedal frame 250, and the upper end portion 251 is placed in the arc-shaped groove portion 341. Then, a fixing plate 344, which has a protuberant portion having a shape protruding along an external shape of the pedal frame 250 and also having four screw hole portions 344b formed therein, is placed on an upper side Up of the upper end portion 251, and screw members 34 are screwed into the corresponding internally threaded portions 343 via the corresponding screw hole portions 344b so as to fix the fixing plate 344 in place.

Figure 7:
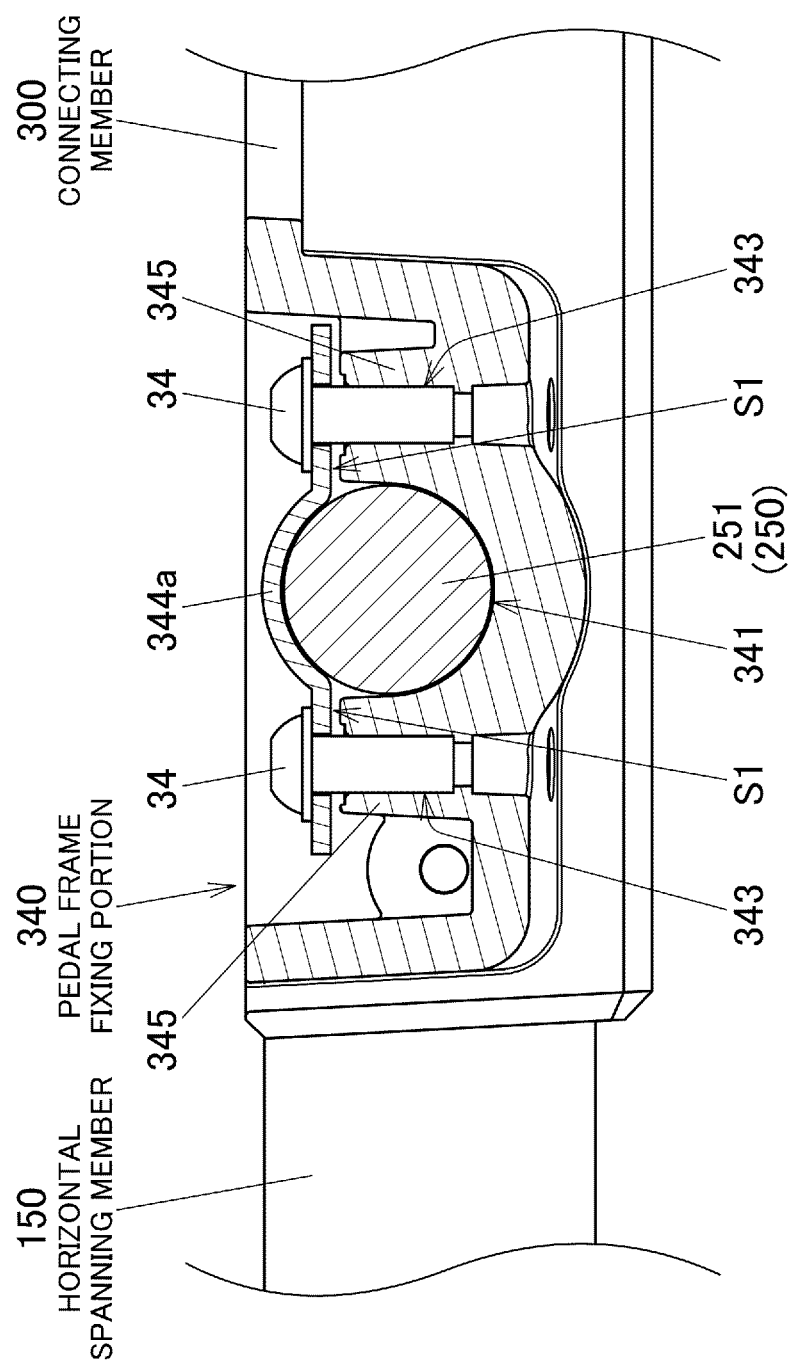
FIG. 7 is a sectional view of the instrument stand according to the embodiment of the present disclosure taken along a line VII-VII in FIG. 2.

Here, as shown in FIG. 7, a gap S1 is defined between a lower surface of the fixing plate 344 and upper surfaces of the wall portions 345. As a result, a spring-back force is generated in the fixing plate 344 as a result of the screw members 34 being screwed tightly. Then, the upper end portion 251 (the pedal frame 250) is pressed against the arc-shaped groove portion 341 so as to be fixed thereto by the fixing plate 344.

In general, in the case of a keyboard instrument set, with a large keyboard instrument, a sufficient depth can be secured from a sitting position of a player below the keyboard instrument, whereby the pedal device can be disposed in a position which is good enough for the pedal device to be operated with the foot of the player. With a compact keyboard instrument, however, in the case that the pedal device is disposed below the keyboard instrument, a distance defined between the foot of the player and the pedal device becomes short, thereby making it difficult for the player to operate the pedal device with the foot. Although the pedal device can also be disposed separately from the keyboard instrument or the leg portions of the instrument stand, when this configuration is adopted, there may be a case in which the keyboard instrument set is enlarged in size as a whole although the keyboard instrument remains compact in size.

In contrast to this, according to the embodiment of the present disclosure, the stand 100 (the instrument stand) includes the connectors 300 configured to fix the horizontal spanning member 150 and each including the instrument attachment portion 330, the pedal frame fixing portion 340, and the leg attachment portion 310.

By adopting this configuration, since the keyboard instrument 10, the pedal device 200, the first leg members 110, and the second leg members 120 can be attached to the connectors 300 which are attached to the horizontal spanning member 150, the keyboard instrument 10 and the pedal device 200 can be integrated with the stand 100 as a single unit, whereby the keyboard instrument 10, the pedal device 200, and the stand 100 altogether can be provided into a compact configuration in terms of size.

In addition, the pedal frame fixing portion 340 is disposed on the back side B of the horizontal spanning member 150 as viewed from the player's side. As a result, since the pedal device 250 can easily be extended downwards towards the lower side Lo after the pedal frame 250 is once extended to the back side B, the pedal device 200 can be disposed well on the back side B of the stand 100, whereby even with the compact keyboard instrument 10, the pedal device 200 can be disposed in the position where the pedal device 200 is easily operated. In the case of the compact keyboard device 10, when the pedal device 200 is disposed directly below the keyboard instrument 10 or on the front side F of the keyboard instrument 10, the player has difficulty in operating the pedal device 200 while pressing down the keys of the keyboard instrument 10 to play it.

The pedal frame fixing portion 340 is provided on the connector 300. The connector 300 includes the horizontal spanning member fixing portion 320, the instrument attachment portion 330 and the like, the pedal frame fixing portion 340, and the leg attachment portion 310. The horizontal spanning member 150, the leg members (the first leg member 110, the second leg member 120), and the pedal frame 250, which are the main constituent members for making up the stand 100, are fixed to the connector 300 altogether. This connector 300 enables the provision of the compact and good stand 100. Additionally, since this connector 300 has the polygonal leg attachment portion 310, the leg members (the first leg member 110, the second leg member 120) having a rectangular cross section can be fixed to the connector 300.

The pedal frame fixing portion 340 is disposed further inwards in the left-right direction LR than the instrument attachment portion 330. As a result, the pedal frame fixing portion 340 can be provided as required by avoiding an interference of the pedal frame 250 with the instrument attachment portion 330.

The leg attachment portion 310 is disposed further outwards in the left-right direction LR than the pedal frame fixing portion 340 and the instrument attachment portion 330. As a result, the degree of freedom in designing the leg members can be increased as with the first leg member 110 and the second leg member 120 which are disposed in such a manner as to expand gradually outwards towards the lower side Lo as viewed not only in the front-back direction FB bus also in the left-right direction LR.

The instrument attachment portion 330 is provided on both the front and the back of the horizontal spanning member 150 as viewed from the player's side as the front instrument attachment portion 331 and the back instrument attachment portion 332. As a result, even in the case that the center of gravity of the keyboard instrument 10 does not lie at a center of an external shape (a case) of the keyboard instrument 10, since the keyboard instrument 10 can be disposed in such a manner as to be offset from the center of the stand 100, the keyboard instrument 10 can be supported stably by the stand 100.

When viewed from the player's side, the instrument attachment portion 330 includes the front instrument attachment portion 331 which is disposed on the front side F of the horizontal spanning member 150 and the back instrument attachment portion 332 which is disposed on the back side B of the horizontal spanning member 150 and which is larger in size than the front instrument attachment portion 331. As a result, even with the keyboard instrument 10 having its center of gravity on the back side B thereof, the keyboard instrument 10 can be supported stably by the stand 100.

The instrument attachment portion 330 includes the positioning pin 331c for positioning an attachment target instrument. As a result, the keyboard instrument 10 can easily be attached to the stand 100.

The stand 100 includes the horizontal spanning member 150 and the leg members including the first leg members 110 which are fixed to the connectors 300. As a result, the good stand 100 can be provided which includes the leg members.

The keyboard instrument stand 1 includes the stand 100 and the keyboard instrument 10. As a result, the keyboard instrument set 1 can be provided which includes the good stand 100.

While the embodiment of the present disclosure has been described heretofore, the embodiment is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents.

What is claimed is:

1. An instrument stand comprising a connector configured to fix a horizontal spanning member, the connector including an instrument attachment portion, a pedal frame fixing portion, and a leg attachment portion;
   wherein the instrument attachment portion comprises a positioning pin configured to position an attachment target instrument.

2. The instrument stand according to claim 1,
   wherein the pedal frame fixing portion is disposed on a back side of the horizontal spanning member as viewed from a player's side.

3. The instrument stand according to claim 1,
   wherein the pedal frame fixing portion is disposed further inwards in a left-right direction than the instrument attachment portion.

4. The instrument stand according to claim 1,
   wherein the leg attachment portion is disposed further outwards in a left-right direction than the pedal frame fixing portion and the instrument attachment portion.

5. The instrument stand according to claim 1,
   wherein the instrument attachment portion is disposed on both a front and a back of the horizontal spanning member as viewed from a player's side.

6. The instrument stand according to claim 1,
wherein the instrument attachment portion comprises a front instrument attachment portion configured to be disposed on a front side of the horizontal spanning member and a back instrument attachment portion configured to be disposed on a back side of the horizontal spanning member and made larger in size than the front instrument attachment member, as viewed from a player's side.

7. The instrument stand according to claim 1, comprising:
the horizontal spanning member; and
a leg member comprising a first leg member configured to be fixed to the connector.

8. A keyboard instrument set comprising:
the instrument stand according to claim 1; and
a keyboard instrument.

\* \* \* \* \*